United States Patent
Nomura et al.

(10) Patent No.: US 8,724,403 B2
(45) Date of Patent: May 13, 2014

(54) CACHE SYSTEM AND INFORMATION-PROCESSING DEVICE

(71) Applicants: Kumiko Nomura, Yokohama (JP); Shinobu Fujita, Inagi (JP); Keiko Abe, Yokohama (JP); Kazutaka Ikegami, Kawasaki (JP); Hiroki Noguchi, Yokohama (JP)

(72) Inventors: Kumiko Nomura, Yokohama (JP); Shinobu Fujita, Inagi (JP); Keiko Abe, Yokohama (JP); Kazutaka Ikegami, Kawasaki (JP); Hiroki Noguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/729,382

(22) Filed: Dec. 28, 2012

(65) Prior Publication Data

US 2013/0268795 A1    Oct. 10, 2013

(30) Foreign Application Priority Data

Apr. 5, 2012 (JP) ................................. 2012-086356

(51) Int. Cl.
*G11C 7/06* (2006.01)

(52) U.S. Cl.
USPC .................. 365/189.07; 365/49.17; 365/207; 365/189.05

(58) Field of Classification Search
USPC ....................... 365/189.07, 49.17, 207, 189.05
See application file for complete search history.

(56) References Cited

U.S. PATENT DOCUMENTS

| | | | |
|---|---|---|---|
| 5,715,426 | A | 2/1998 | Takahashi et al. |
| 6,775,741 | B2 | 8/2004 | Ebeshu et al. |
| 2001/0030892 | A1* | 10/2001 | Takarabe ................. 365/189.05 |

FOREIGN PATENT DOCUMENTS

| | | |
|---|---|---|
| JP | 4-328656 | 11/1992 |
| JP | 2002-63073 | 2/2002 |
| JP | 2003-150446 | 5/2003 |
| JP | 2004-265430 | 9/2004 |

OTHER PUBLICATIONS

First Office Action for Japanese Application No. 2012-086356, mailed by the Japanese Patent Office Oct. 1, 2013. 5 pgs. (incl. translation).

Gerosa, G. et al., "A Sub-1W to 2W Low-Power IA Processor for Mobile Internet Devices and Ultra-Mobile PCs in 45nm Hi-K Metal Gate CMOS," Digest of Technical Papers, 2008 IEEE International Solid-State Circuits Conference, ISSCC 2008, Session 13, Mobile Processing, 13.1, pp. 256-257 and 611, (2008).

* cited by examiner

*Primary Examiner* — Jason Lappas
(74) *Attorney, Agent, or Firm* — Finnegan, Henderson, Farabow, Garrett & Dunner, LLP

(57) ABSTRACT

According to one embodiment, a cache system includes a tag memory includes a volatile memory device, the tag memory includes ways and storing a tag for each line, a data memory includes a nonvolatile memory device including sense amplifiers for reading data, the data memory includes ways and storing data for each line, a comparison circuit configured to compare a tag included in an address supplied from an external with a tag read from the tag memory, and a controller configured to turn off a power of a sense amplifier for a way which is not accessed based on a comparison result of the comparison circuit.

19 Claims, 9 Drawing Sheets

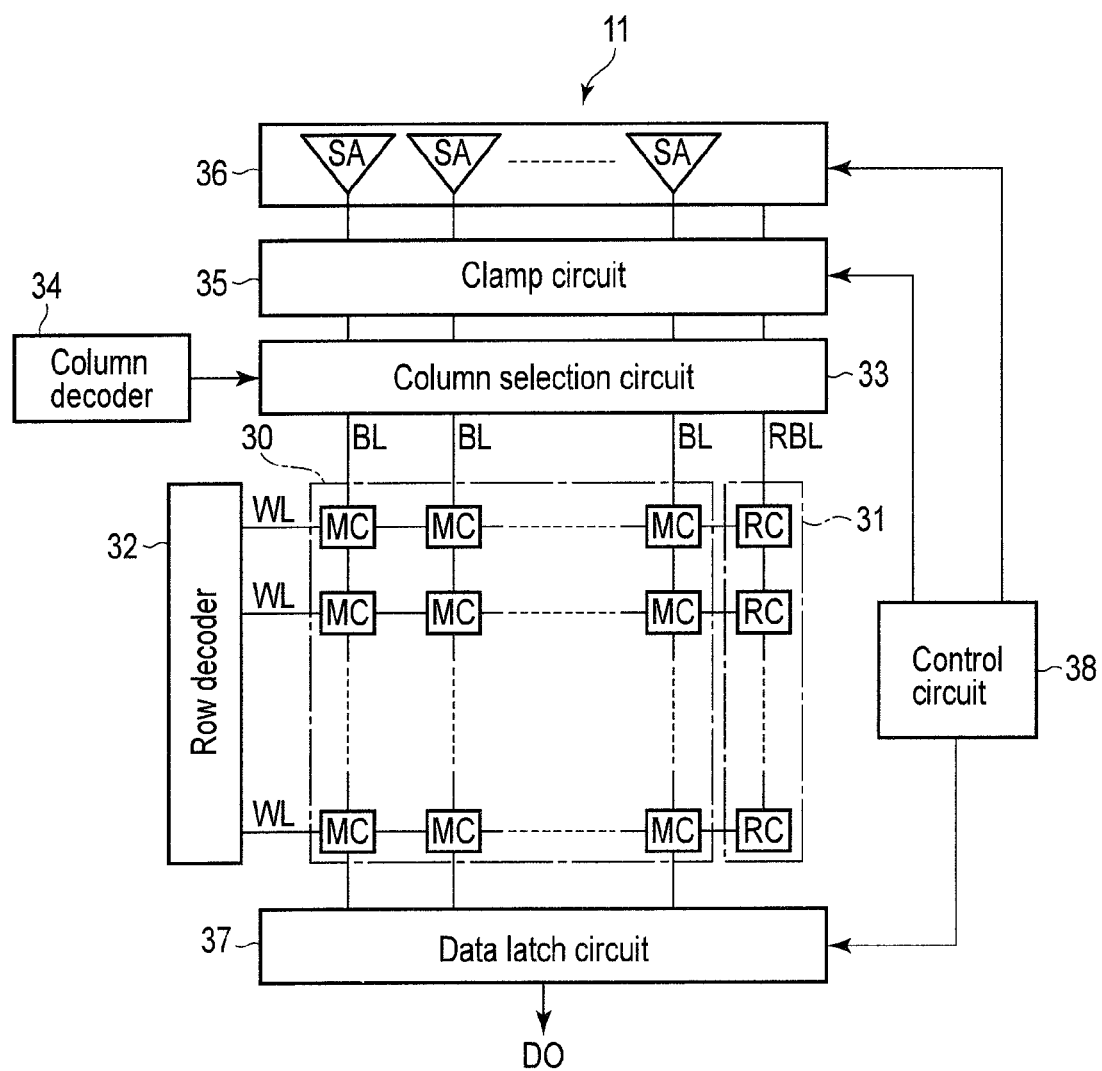
F I G. 3

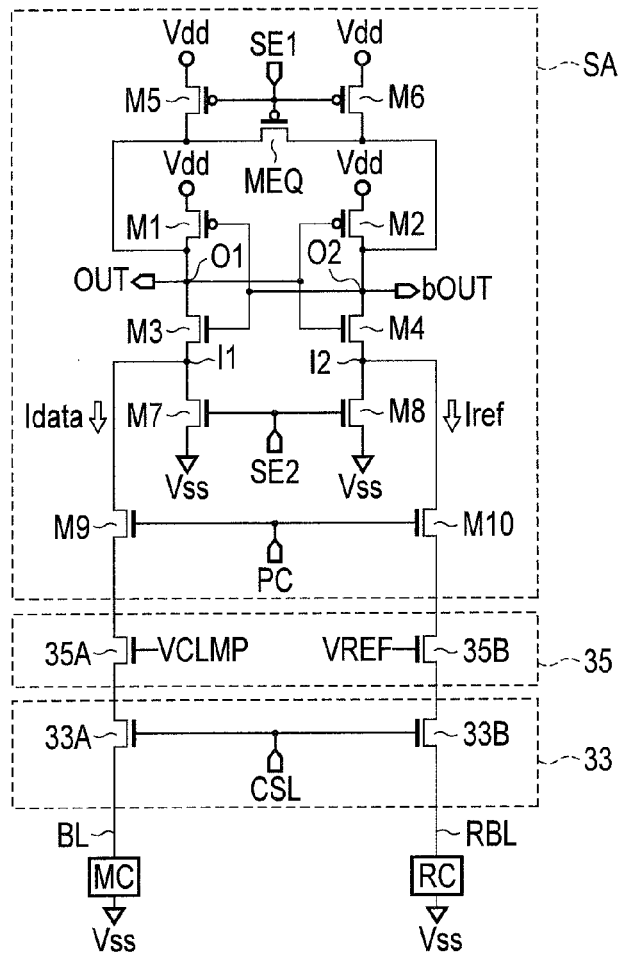
F I G. 4
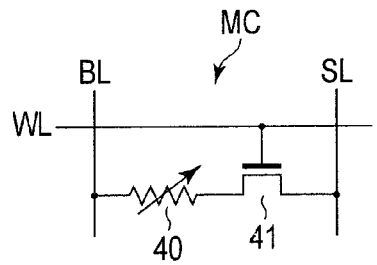
F I G. 5
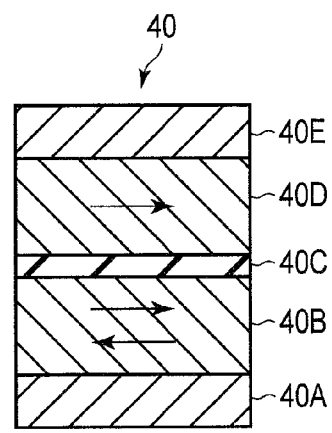
F I G. 6

CACHE SYSTEM AND INFORMATION-PROCESSING DEVICE

CROSS-REFERENCE TO RELATED APPLICATIONS

This application is based upon and claims the benefit of priority from Japanese Patent Application No. 2012-086356, filed Apr. 5, 2012, the entire contents of which are incorporated herein by reference.

FIELD

Embodiments described herein relate generally to a cache system and information-processing device.

BACKGROUND

The operating frequency of processors tends to increase year by year, but the operating speed of the system memory used in main memory does not increase commensurately. Therefore, it is usual to use a cache memory to bridge the gap between the processor and system memory. Further, the cache memory is formed into a hierarchical form.

Recently, a need has arisen to reduce the power consumption of the entire system. Therefore, it has become necessary to reduce the power consumption of an operating device portion in the system. As one of the techniques for reducing power consumption, consideration has been given to changing the cache memory from a volatile memory such as a static random access memory (SRAM) to a nonvolatile memory such as a magnetic random access memory (MRAM).

Since the standby power of the nonvolatile memory is lower than that of the SRAM, power consumption as a whole can be reduced. On the other hand, there occurs a problem that the operating power becomes high. That is, in the SRAM, the voltage of a bit line is set when a read request is issued and a voltage is applied to a word line to perform a read operation. In this case, since it takes a long time to charge the word line, the power caused by transition of the opened bit line voltage constitutes most of the power consumption when reading during the above period.

In case the MRAM that is the nonvolatile memory is used as the cache memory, a sense amplifier is driven and a current is caused to flow through the memory element of the MRAM to read the memory element when a read request is issued. However, since the sense amplifier is kept driven until reading is complete and it finally becomes possible to read at the stage in which a read current is stabilized, it becomes necessary to continuously pass the current during the above period. Since the time until the current is stabilized is extremely long, the power consumption thereof becomes higher in comparison with that of the SRAM.

BRIEF DESCRIPTION OF THE DRAWINGS

FIG. 3 is a block diagram of a data memory shown in FIG. 2;

FIG. 4 is a circuit diagram showing a configuration example of one column including one sense amplifier;

FIG. 5 is a circuit diagram of a memory cell;

FIG. 6 is a cross-sectional view of an MTJ element shown in FIG. 5;

DETAILED DESCRIPTION

Figure 1:
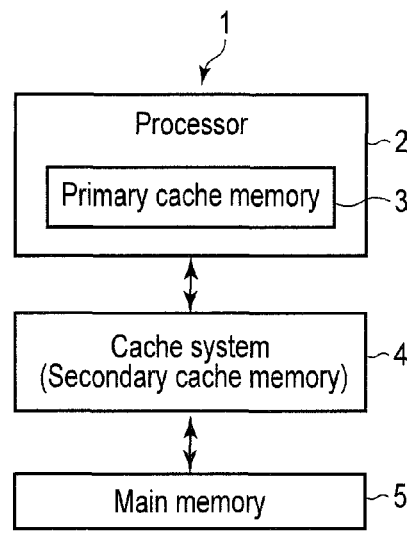
FIG. 1 is a block diagram of an information-processing device according to a first embodiment.

In general, according to one embodiment, there is provided a cache system comprising:

a tag memory comprising a volatile memory device, the tag memory comprising ways and storing a tag for each line;

a data memory comprising a nonvolatile memory device including sense amplifiers for reading data, the data memory comprising ways and storing data for each line;

a comparison circuit configured to compare a tag included in an address supplied from an external with a tag read from the tag memory; and a controller configured to turn off a power of a sense amplifier for a way which is not accessed based on a comparison result of the comparison circuit.

The embodiments will now be described with reference to the accompanying drawings. Several embodiments below explain apparatuses and methods for embodying the technical concept of the present invention. The technical concept of the present invention is not limited by the shapes, structures, and layouts of the constituent components. Note that in the following explanation, the same reference numerals denote elements having the same functions and arrangements, and a repetitive explanation will be made only when necessary.

First Embodiment

[1] Configuration of Information-Processing Device

FIG. 1 is a block diagram of an information-processing device 1 according to a first embodiment. The information-processing device 1 comprises a processor 2, cache system (secondary cache memory) 4, and main memory (system memory) 5.

The processor 2 is a central processing unit (CPU) that is used for controlling the operation of the information-processing device 1 and executes a program stored in the main memory 5 to control the cache system 4 and other circuits (not shown). The processor 2 comprises a primary cache memory 3. The primary cache memory 3 temporarily stores data to be stored in the main memory 5. The primary cache memory 3 is a fast buffer memory that the operating unit in the processor 2 first accesses to read data. The primary cache memory 3 is constituted by an SRAM, for example.

The cache system 4 has a function as a secondary cache memory and temporarily stores data to be stored in the main memory 5 by means of the processor 2. The operating unit in the processor 2 first accesses the primary cache memory 3 to read data and if target data is not present in the primary cache memory 3, it accesses the cache system 4 to read data. Further, if target data is not present in the cache system 4, the cache system 4 accesses the main memory 5 to read data.

Thus, the information-processing device 1 having the primary cache and secondary cache can realize a fast data read process. The number of hierarchies of the cache can be freely set.

[1-1] Configuration of Cache System 4

Figure 2:
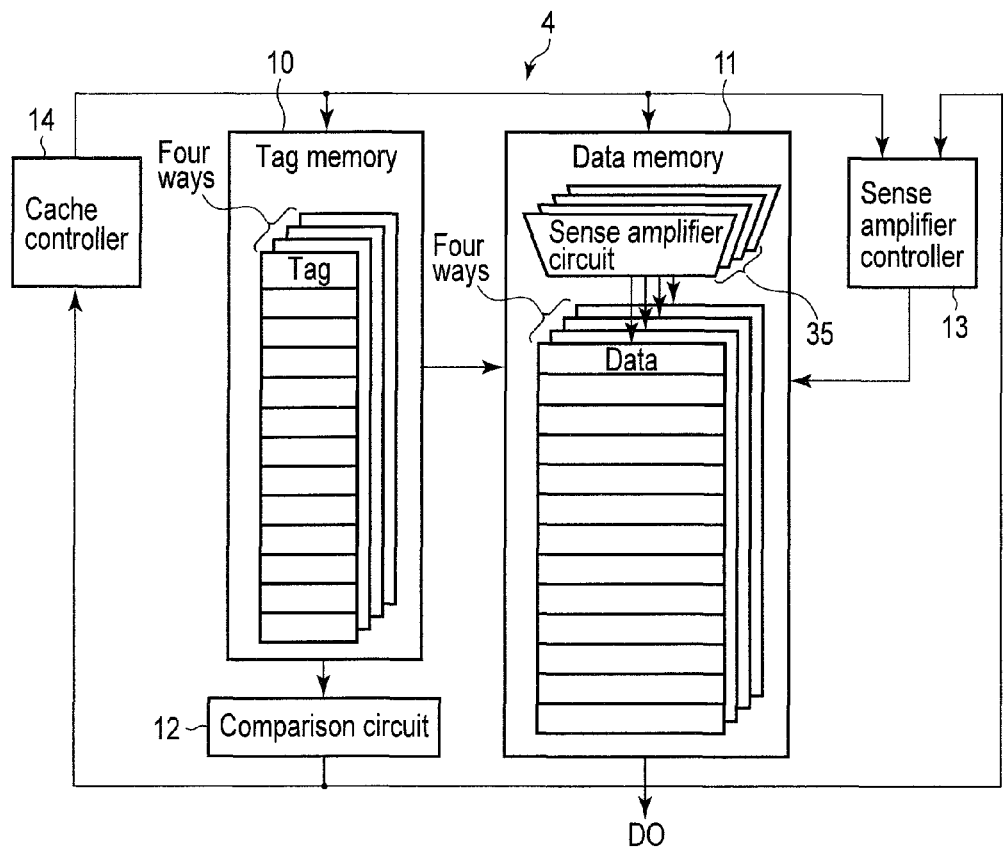
FIG. 2 is a block diagram of a cache system shown in FIG. 1.

Next, the configuration of the cache system 4 is explained. FIG. 2 is a block diagram of the cache system 4. The cache system 4 is a four-way set associative type cache system, for example. The number of ways can be freely set. The cache system 4 comprises a tag memory 10, data memory 11, comparison circuit 12, sense amplifier controller 13, and cache controller 14.

The tag memory 10 comprises a volatile memory and is constituted by an SRAM, for example. The tag memory 10 stores tags in units of lines included in each way. The line stores one or more data items each comprising data of the minimum unit transferred between the processor 2 and the cache system 4. The tag memory 10 receives a line address from the cache controller 14 and reads a tag of each way corresponding to the line. The line address is an address used to specify a line common to the four ways. Then, the tag memory 10 sends the read tag of each way to the comparison circuit 12.

The comparison circuit 12 compares the tag supplied from the cache controller 14 with the tag of each way read from the tag memory 10 and sends the comparison result to the sense amplifier controller 13 and cache controller 14.

The data memory 11 comprises a nonvolatile memory and is constituted by an MRAM, for example. The data memory 11 stores data included in the line. That is, each line includes a tag of the tag memory 10 and data of the data memory 11 and the tag is address information of corresponding data. Further, data included in one line includes a plurality of words.

The sense amplifier controller 13 receives information indicating what line of a way that coincides with (hits) the tag supplied from the processor 2 from the comparison circuit 12 and receives a word address from the cache controller 14. The word address is an address indicating what word of data included in one line. The sense amplifier controller 13 controls the powers of the sense amplifiers included in the data memory 11 based on the above information items.

The cache controller 14 controls the operation of the cache system 4. Further, the cache controller 14 sends the tag among the address received from the processor 2 to the comparison circuit 12, sends the line address to the tag memory 10 and sends the word address to the sense amplifier controller 13.

[1-2] Configuration of Data Memory 11

Next, the configuration of the data memory 11 included in the cache system 4 is explained. FIG. 3 is a block diagram of the data memory 11. As described before, the data memory 11 is constituted by an MRAM. The data memory 11 comprises a memory cell array 30, reference cell array 31, row decoder 32, column select circuit 33, column decoder 34, clamp circuit 35, sense amplifier circuit 36, data latch circuit 37, and control circuit 38.

The memory cell array 30 has a plurality of memory cells MC arranged in a matrix form. In the memory cell array 30, a plurality of word lines WL extending in a row direction and a plurality of bit lines BL extending in a column direction are arranged. Each memory cell MC is connected to corresponding one word line WL and corresponding one bit line BL.

The reference cell array 31 has a plurality of reference cells RC arranged in the column direction. In the reference cell array 31, one reference bit line RBL extending in the column direction and a plurality of word lines WL commonly connected to the memory cell array 30 are arranged. Each reference cell RC is connected to corresponding one word line WL and reference bit line RBL.

The row decoder 32 is connected to plural word lines WL. The row decoder 12 selects one of word lines WL based on a row address.

The column select circuit 33, clamp circuit 35, and sense amplifier circuit 36 are connected to bit lines BL and reference bit line RBL. The column select circuit 33 selects one of bit lines BL and reference bit line RBL based on column select signal CSL. The column decoder 34 generates column select signal CSL based on a column address and sends column select signal CSL to the column select circuit 33. The clamp circuit 35 clamps bit line BL and reference bit line RBL to a preset voltage.

The sense amplifier circuit 36 comprises a plurality of sense amplifiers SA corresponding in number to bit lines BL. The sense amplifier circuit 36 senses and amplifies data of selected memory cell MC by use of a cell current of bit line BL selected by the column select circuit 33 and a reference current of reference bit line BL during a read.

The data latch circuit 37 latches data read by means of the sense amplifier circuit 36 and outputs the latched data as output data DO to the external (processor 2). The control circuit 38 sends various control signals and voltages to the clamp circuit 35, sense amplifier circuit 36, and data latch circuit 37 to control the operations of the circuits.

FIG. 4 is a circuit diagram showing a configuration example of one column including one sense amplifier SA. Sense amplifier SA is a current differential type sense amplifier. The main body of sense amplifier SA comprises a flip-flop circuit (latch) that includes P-channel MOSFETs M1 and M2, and N-channel MOSFETs M3 and M4.

The drain of P-channel MOSFET M1 is connected to output node O1, the gate thereof is connected to output node O2 and the source thereof is connected to power terminal Vdd. Further, the drain of P-channel MOSFET M2 is connected to output node O2, the gate thereof is connected to output node O1 and the source thereof is connected to power terminal Vdd.

The drain of N-channel MOSFET M3 is connected to output node O1, the gate thereof is connected to output node O2 and the source thereof is connected to input node I1. Further, the drain of N-channel MOSFET M4 is connected to output node O2, the gate thereof is connected to output node O1 and the source thereof is connected to input node I2.

A circuit that short-circuits output nodes O1 and O2 to power terminal Vdd and equalizes voltages of output nodes O1 and O2 before starting the sense operation is connected to output nodes O1 and O2 of the main body. In this example, output nodes O1 and O2 are short-circuited to power terminal Vdd by means of P-channel MOSFETs M5 and M6 and voltages of output nodes O1 and O2 are equalized by means of P-channel MOSFET MEQ.

N-channel MOSFETs M7 and M8 respectively connected to input nodes I1 and I2 are turned on after the sense operation is started and have a function of enhancing the speed of the sense operation.

The sense operation is started by making SE1 high and turning off P-channel MOSFETs M5, M6, and MEQ. Cell current Idata discharges output node O1 of sense amplifier SA. Likewise, reference current Iref discharges output node O2 of sense amplifier SA. After this, SE2 is made high and N-channel MOSFETs M7 and M8 are turned on. Sense amplifier SA outputs data OUT from output node O1 and outputs inverted data bOUT of data OUT from output node O2.

At this time, for example, sense amplifier SA includes N-channel MOSFETs M9 and M10 as a circuit that cuts off the consumption current, that is, turns off the power of sense amplifier SA. The drain of N-channel MOSFET M9 is connected to input node I1, the gate thereof is supplied with power-cut signal PC and the source thereof is connected to the clamp circuit 35. The drain of N-channel MOSFET M10 is connected to input node I2, the gate thereof is supplied with power-cut signal PC and the source thereof is connected to the clamp circuit 35. Power-cut signal PC is supplied from the sense amplifier controller 13.

When power-cut signal PC is high, N-channel MOSFETs M9 and M10 are turned on and sense amplifier SA can be driven. When power-cut signal PC is low, N-channel MOSFETs M9 and M10 are turned off and cell current Idata and reference current Iref are cut. That is, the power of sense amplifier SA is turned off.

The clamp circuit 35 includes N-channel MOSFETs 35A and 35B, for example. The drain of N-channel MOSFET 35A is connected to sense amplifier SA (the source of N-channel MOSFET M9), the gate thereof is applied with clamp voltage VCLMP from a voltage generation circuit (not shown) and the source thereof is connected to the column select circuit 33. The drain of N-channel MOSFET 35B is connected to sense amplifier SA (the source of N-channel MOSFET M10), the gate thereof is applied with clamp voltage VREF from a voltage generation circuit (not shown) and the source thereof is connected to the column select circuit 33.

The column select circuit 33 includes N-channel MOSFETs 33A and 33B, for example. The drain of N-channel MOSFET 33A is connected to the clamp circuit 35 (the source of N-channel MOSFET 35A), the gate thereof is supplied with column select signal CSL and the source thereof is connected to memory cell MC via bit line BL. The drain of N-channel MOSFET 33B is connected to the clamp circuit 35 (the source of N-channel MOSFET 35B), the gate thereof is supplied with column select signal CSL and the source thereof is connected to reference cell RC via reference bit line RBL.

In the configuration example of the MRAM of FIG. 3, the configuration is made to use the reference cell connected to a selected word line that is connected to a selected memory cell when data of the selected memory cell is read. However, the configuration is not limited to the configuration of FIG. 3 and, for example, the configuration may be made to arrange a pair of one memory cell and one reference cell and connect the pair to a sense amplifier or select the same reference cell in each cycle during a read.

[1-3] Configurations of Memory Cell MC and Reference Cell RC

Next, the configurations of memory Cell MC and reference Cell RC are explained. FIG. 5 is a circuit diagram of memory cell MC. Memory cell MC comprises a magnetoresistive element (magnetic tunnel junction [MTJ] element) 40 and select transistor 41. For example, the select transistor 41 is formed of an N-channel MOSFET.

One end of the MTJ element 40 is connected to bit line BL and the other end thereof is connected to the drain of the select transistor 41. The gate of the select transistor 41 is connected to word line WL and the source thereof is connected to source line SL. Ground voltage Vss is applied to source line SL during the read. Reference cell RC also has the same configuration as memory cell MC.

FIG. 6 is a cross-sectional view of the MTJ element 40. The MTJ element 40 is constituted by sequentially laminating a lower electrode 40A, memory layer (also called a free layer) 40B, nonmagnetic layer (tunnel barrier layer) 40C, reference layer (also called a fixed layer) 40D, and upper electrode 40E. The order of lamination can be reversed.

The memory layer 40B and reference layer 40D are each formed of a ferromagnetic material. As the tunnel barrier layer 40C, an insulating layer formed of MgO, for example, is used.

The memory layer 40B and reference layer 40D each have magnetic anisotropy in an in-plane direction and the direction of easy magnetization thereof is set in the in-plane direction. The magnetization directions of the memory layer 40B and reference layer 40D may be set in a direction perpendicular to the film surface.

The magnetization direction of the memory layer 40B is variable (reversed). The magnetization direction of the reference layer 40D is invariable (fixed). The reference layer 40D is formed to have perpendicular magnetization anisotropic energy sufficiently higher than that of the memory layer 40B. Setting of the magnetic anisotropy can be made by adjusting the configuration of the materials and the thickness. Thus, the magnetization switching current of the memory layer 40B is reduced and the magnetization switching current of the reference layer 40D is set larger than that of the memory layer 40B. As a result, the MTJ element 40 including the memory layer 40B whose magnetization direction is variable with respect to a preset write current and the reference layer 40D whose magnetization direction is invariable can be realized.

In this embodiment, a spin-transfer torque writing system in which a write current is directly passed through the MTJ element 40 to control the magnetization state of the MTJ element 40 according to the write current is used. The MTJ element 40 can be set to one of the low-resistance state and high-resistance state according to whether the relative relation of magnetization between the memory layer 40B and the reference layer 40D is parallel or anti-parallel.

If the write current directed from the memory layer 40B to the reference layer 40D is passed through the MTJ element 40, the relative relation of magnetization between the memory layer 40B and the reference layer 40D becomes parallel. In the case of the parallel state, the resistance of the MTJ element 40 becomes the lowest and the MTJ element 40 is set to the low-resistance state. For example, the low-resistance state of the MTJ element 40 is defined as binary 0.

On the other hand, if the write current directed from the reference layer 40D to the memory layer 40B is passed through the MTJ element 40, the relative relation of magnetization between the memory layer 40B and the reference layer 40D becomes anti-parallel. In the case of the anti-parallel state, the resistance of the MTJ element 40 becomes the highest and the MTJ element 40 is set to the high-resistance state. For example, the high-resistance state of the MTJ element 40 is defined as binary 1.

As a result, the MTJ element 40 can be used as a memory element capable of storing one-bit data (binary data). Allocation of the low-resistance state of the MTJ element 40 and data can be freely set.

Reference current Iref flowing through reference cell RC is set to an intermediate current between cell current I0 of memory cell MC that stores binary 0 and cell current I1 of memory cell MC that stores binary 1. Specifically, this can be realized by use of two types of methods of (1) writing binary 0 reference cell RC, for example, and adjusting clamp voltage VREF to be made different from clamp voltage VCLMP and (2) setting the resistance of reference cell RC to an intermediate value between the resistance of memory cell MC that stores binary 0 and the resistance of memory cell MC that stores binary 1 and setting clamp voltage VREF to the same value as clamp voltage VCLMP.

[2] Operation of Cache System 4

Figure 7:
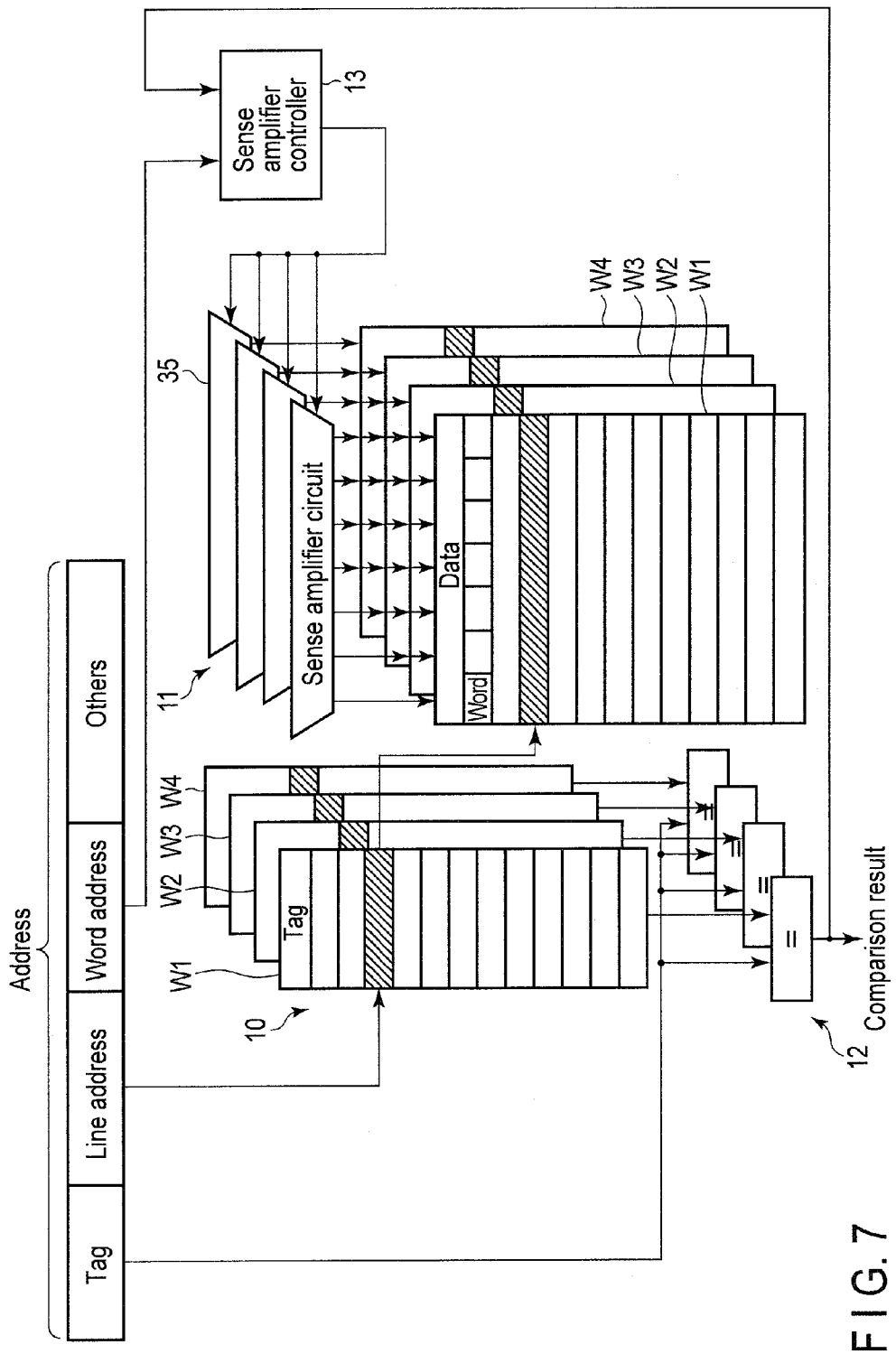
FIG. 7 is a diagram for illustrating the operation of the cache system.
Figure 8:
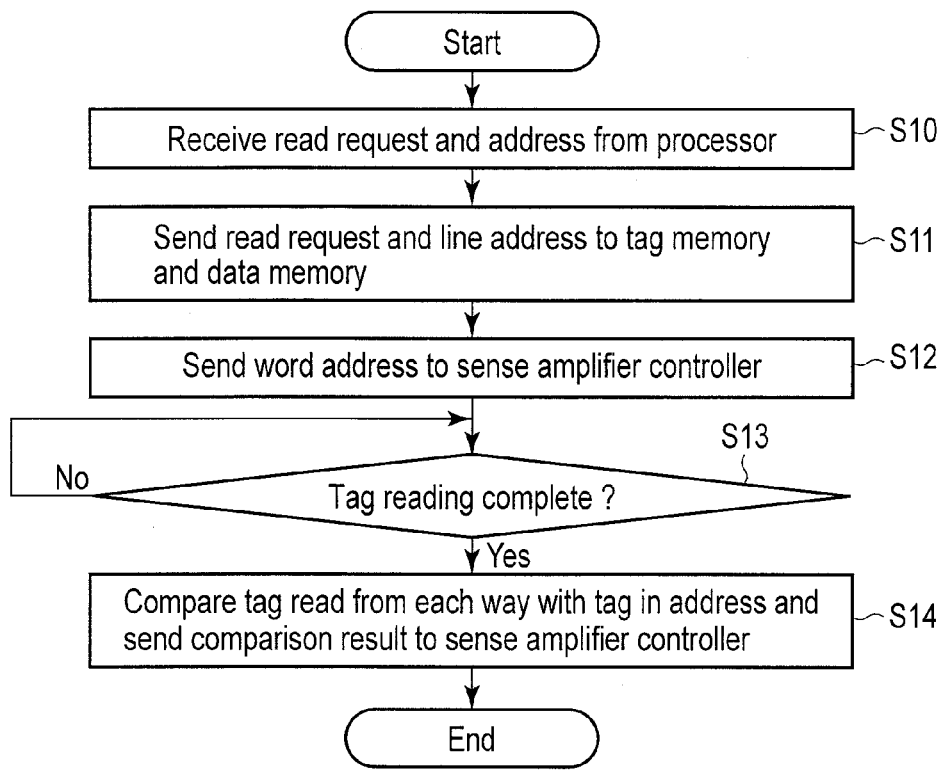
FIG. 8 is a flowchart for illustrating the operations of a cache controller and comparison circuit.

The operation of the cache system 4 with the above configuration is explained. FIG. 7 is a diagram for illustrating the operation of the cache system 4. FIG. 8 is a flowchart for illustrating the operations of the cache controller 14 and comparison circuit 12.

First, the cache controller 14 receives a read request and address from the processor 2 (step S10). As shown in FIG. 7, the address supplied from the processor 2 includes a tag, line address, and word address.

Then, the cache controller 14 sends the read request and line address to the tag memory 10 and data memory 11 (step S11). As a result, the tag memory 10 starts to read tags stored in four lines specified by the line address among four ways W1 to W4. Further, the data memory 11 starts to read data items stored in four lines specified by the line address among four ways W1 to W4.

Next, the cache controller 14 sends the word address to the sense amplifier controller 13 (step S12).

After reading of the tags from ways W1 to W4 of the tag memory 10 is complete (step S13), the comparison circuit 12 compares a tag read from each of ways W1 to W4 with a tag supplied from the cache controller 14 and determines whether the tags coincide with each other or not. Then, the comparison circuit 12 sends the comparison result to the sense amplifier controller 13 and cache controller 14 (step S14). Since the tag memory 10 that stores tags is constituted by an SRAM to perform a fast read operation, the comparison result containing a signal that indicates whether the tags coincide or not is more rapidly output.

If it is determined that none of the tags coincide according to the comparison result of the comparison circuit 12 (cache miss), this means that target data is not present in the cache system 4. In this case, the cache controller 14 informs the processor 2 that a cache miss occurs and terminates reading by the cache system 4.

Figure 9:
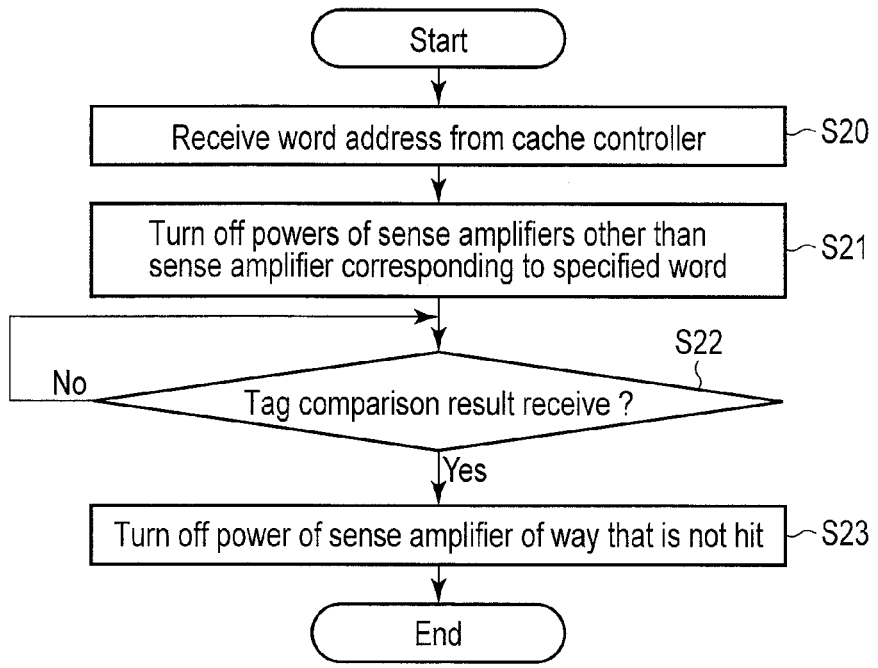
FIG. 9 is a flowchart for illustrating the operation of a sense amplifier controller.

FIG. 9 is a flowchart for illustrating the operation of the sense amplifier controller 13. In the initial condition, the sense amplifier controller 13 sends a high power-cut signal PC to all sense amplifiers SA of the data memory 11. As a result, all sense amplifiers SA can be driven, that is, the powers of all sense amplifiers SA are turned on and the data memory 11 continuously reads data stored in the four lines specified by the line address among four ways W1 to W4.

The data memory 11 is constituted by an MRAM and the data size of data included in the line is larger than that of the tag. Therefore, the read operation speed of the data memory 11 becomes lower than that of the tag memory 10 and the power consumption thereof becomes larger. As a result, the read operation of the data memory 11 is not yet complete when the comparison result by the comparison circuit 12 is output.

First, the sense amplifier controller 13 receives a word address from the cache controller 14 (step S20). Then, the cache controller 14 turns off the powers of sense amplifiers SA other than sense amplifier SA corresponding to a word specified by the word address of data included in the line (step S21). Specifically, the cache controller 14 sends a low power-cut signal PC to sense amplifier SA whose power is to be turned off. As a result, since cell current Idata and reference current Iref to sense amplifier SA that has received the low power-cut signal PC are cut, the power of the above sense amplifier SA is turned off.

Then, when receiving the comparison result from the comparison circuit 12 (step S22), the sense amplifier controller 13 turns off the powers of sense amplifiers SA of the ways that does not include a line corresponding to the coinciding tag (the hit tag) (step S23). At this time, only sense amplifier SA corresponding to a word specified by a word address in the hit line is driven and the powers of other sense amplifiers SA are turned off.

After this, target data is read from the data memory 11 and the thus read data is supplied to the processor 2. At this time, the data latch circuit 37 outputs only data corresponding to the word address.

In this embodiment, since it is sufficient if the powers of the sense amplifiers can be turned on/off in the word unit, the sense amplifier group corresponding to each word is configured to be supplied with common power-cut signal PC used for turning on/off the powers of the sense amplifiers. As a result, it is possible to reduce the number of signal lines.

[3] Effect

As described above in detail, in the first embodiment, the tag memory 10 that stores a tag for each line is constituted by the volatile memory (SRAM) and the data memory 11 that stores data for each line is constituted by the nonvolatile memory (MRAM) in the cache system 4 utilizing the set associative system. Then, the powers of sense amplifiers SA of ways that are not accessed are turned off based on the tag comparison result.

Therefore, according to the first embodiment, the powers of sense amplifiers SA that are not required to perform the operation of reading target data from the data memory 10 can be turned off after the processor 2 issues a read request. As a result, since extra power consumption can be suppressed, the power consumption of the cache system 4 can be reduced.

Further, data included in one line of the data memory 11 includes a plurality of words and the powers of sense amplifiers SA other than sense amplifier SA corresponding to the word specified by the word address are turned off. As a result, the power consumption of the cache system 4 can be further reduced.

Since the MRAM can be used in the data memory 11, the standby power can be reduced.

In this embodiment, an SRAM is used in the tag memory 10, but the tag memory 10 may be constituted by an MRAM like the data memory 11.

Second Embodiment

[1] Configuration of Cache System 4

Figure 10:
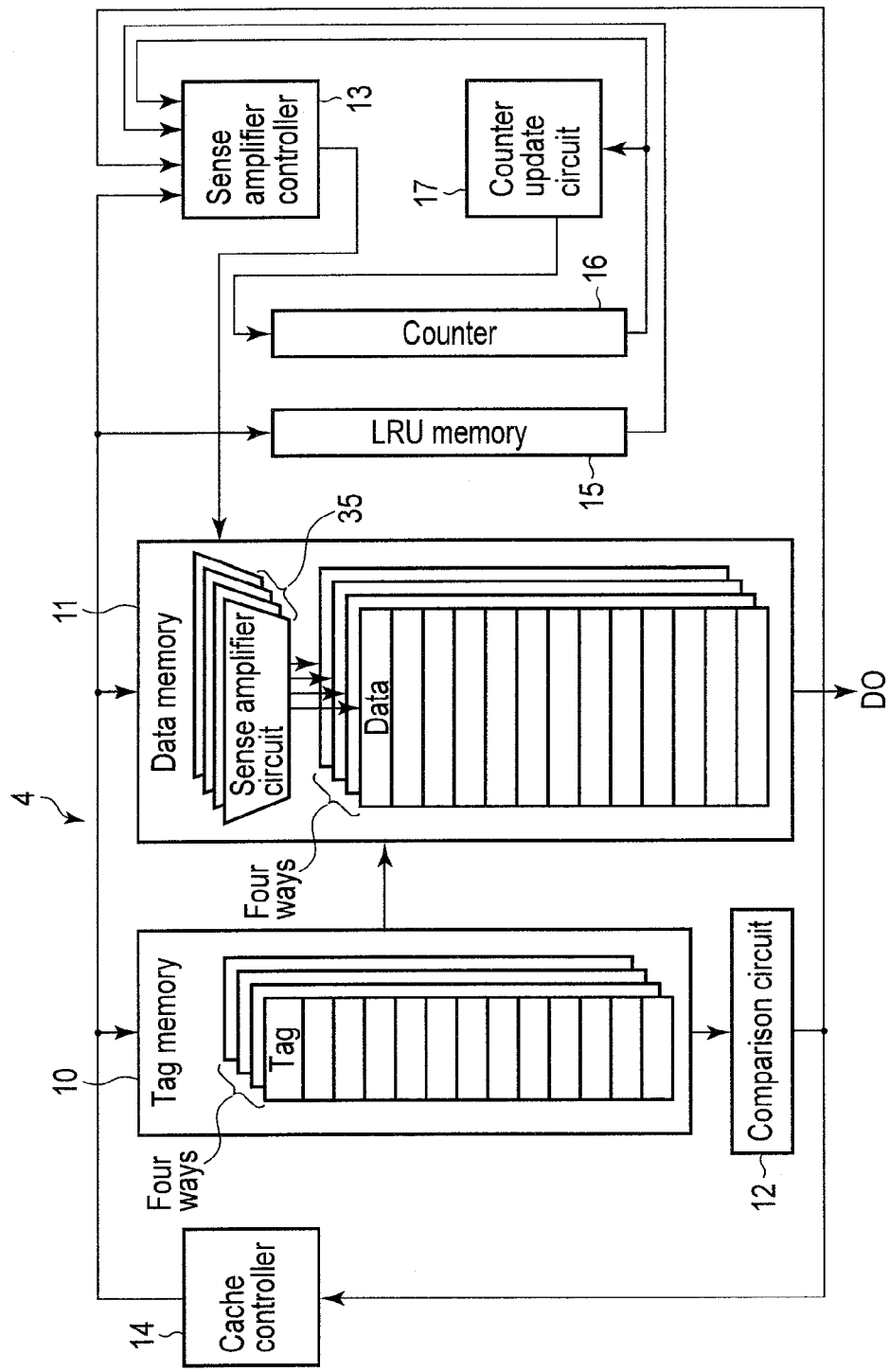
FIG. 10 is a block diagram of a cache system according to a second embodiment.

FIG. 10 is a block diagram of a cache system 4 according to a second embodiment. The cache system 4 further comprises a least recently used (LRU) memory 15, counter 16, and counter update circuit 17. The other configuration is the same as that of the first embodiment.

The LRU memory 15 stores LRU information. For example, the LRU memory 15 is constituted by a register. LRU information is information that indicates the order from the most recently accessed way while a line common to the four ways is set as a unit. When the capacity of the cache has reached the upper limit, LRU information is used to erase data of the least recently accessed line (a line in which accessed time is old) and acquire available capacity. Furthermore, the information is used to control the power of sense amplifier SA in this embodiment. LRU information is updated by means of a cache controller 14 each time the cache system 4 receives a read request and write request from the processor 2.

The counter 16 holds information indicating the length of time that has elapsed after the line is finally accessed while a line common to the four ways is set as a unit. That is, the counter 16 has a count for each line common to the four ways. The counter update circuit 17 updates the count of the counter 16 each time the cache system 4 is accessed from the processor 2 (receives a read request and write request). Specifically, the counter update circuit 17 resets the count corresponding to the hit line and increments the counts corresponding to the other lines by 1 each time the cache system 4 is accessed from the processor 2. As a result, the count of the line with respect to which a long time has elapsed after the line is finally accessed in the counter 16 becomes larger. The length of time that has elapsed after the line is finally accessed can be determined by referring to the count for each line.

[2] Operation of Cache System 4

Figure 11:
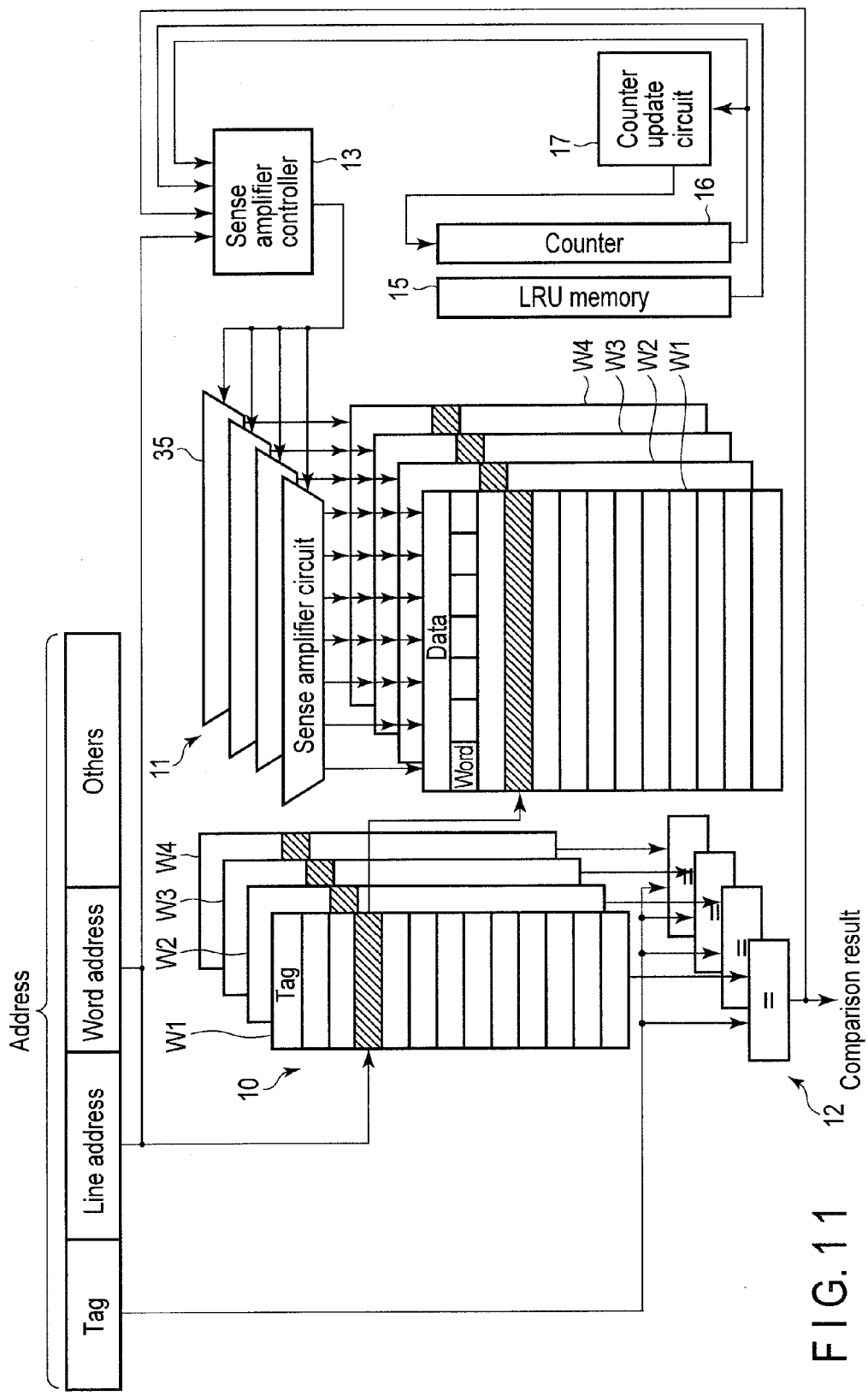
FIG. 11 is a diagram for illustrating the operation of the cache system.
Figure 12:
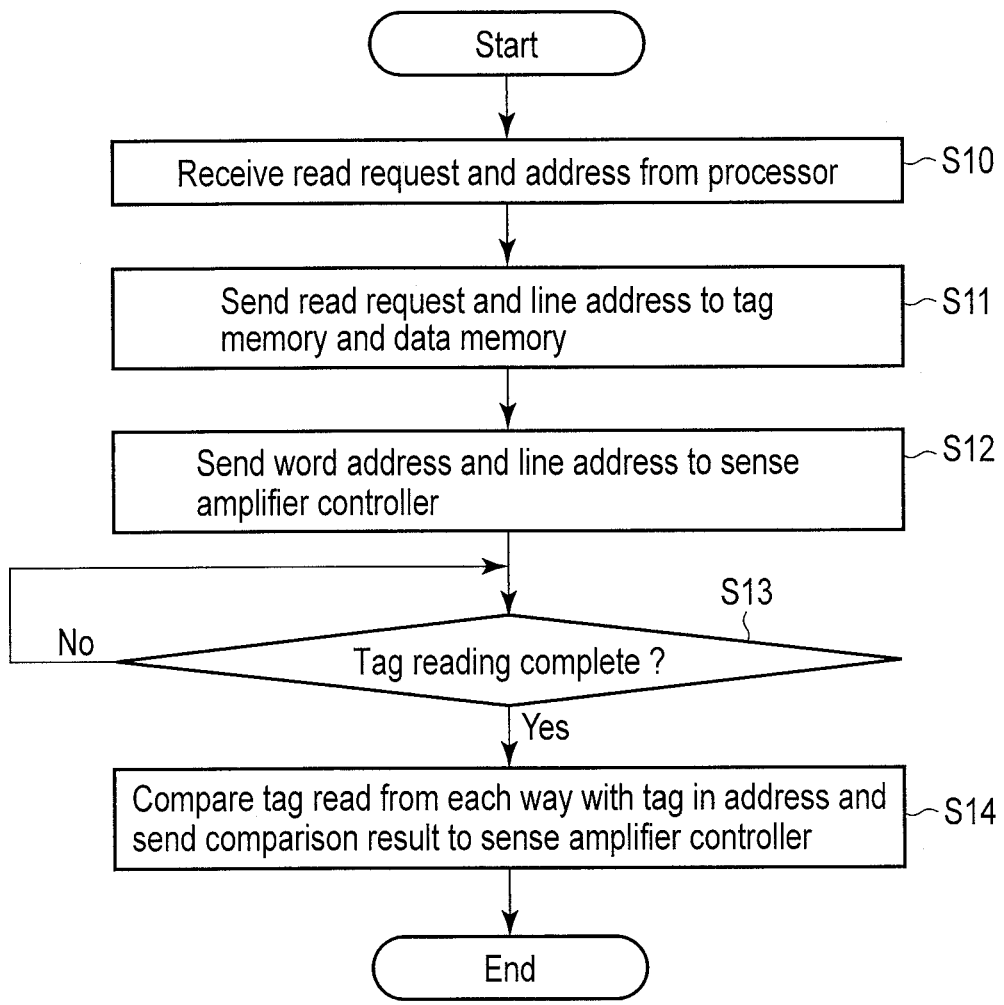
FIG. 12 is a flowchart for illustrating the operations of a cache controller and comparison circuit.

The operation of the cache system 4 with the above configuration is explained. FIG. 11 is a diagram for illustrating the operation of the cache system 4. FIG. 12 is a flowchart for illustrating the operations of the cache controller 14 and comparison circuit 12. In step S12, the cache controller 14 sends a word address and line address to a sense amplifier controller 13. The operation other than step S12 is the same as that of FIG. 8 explained in the first embodiment.

Figure 13:
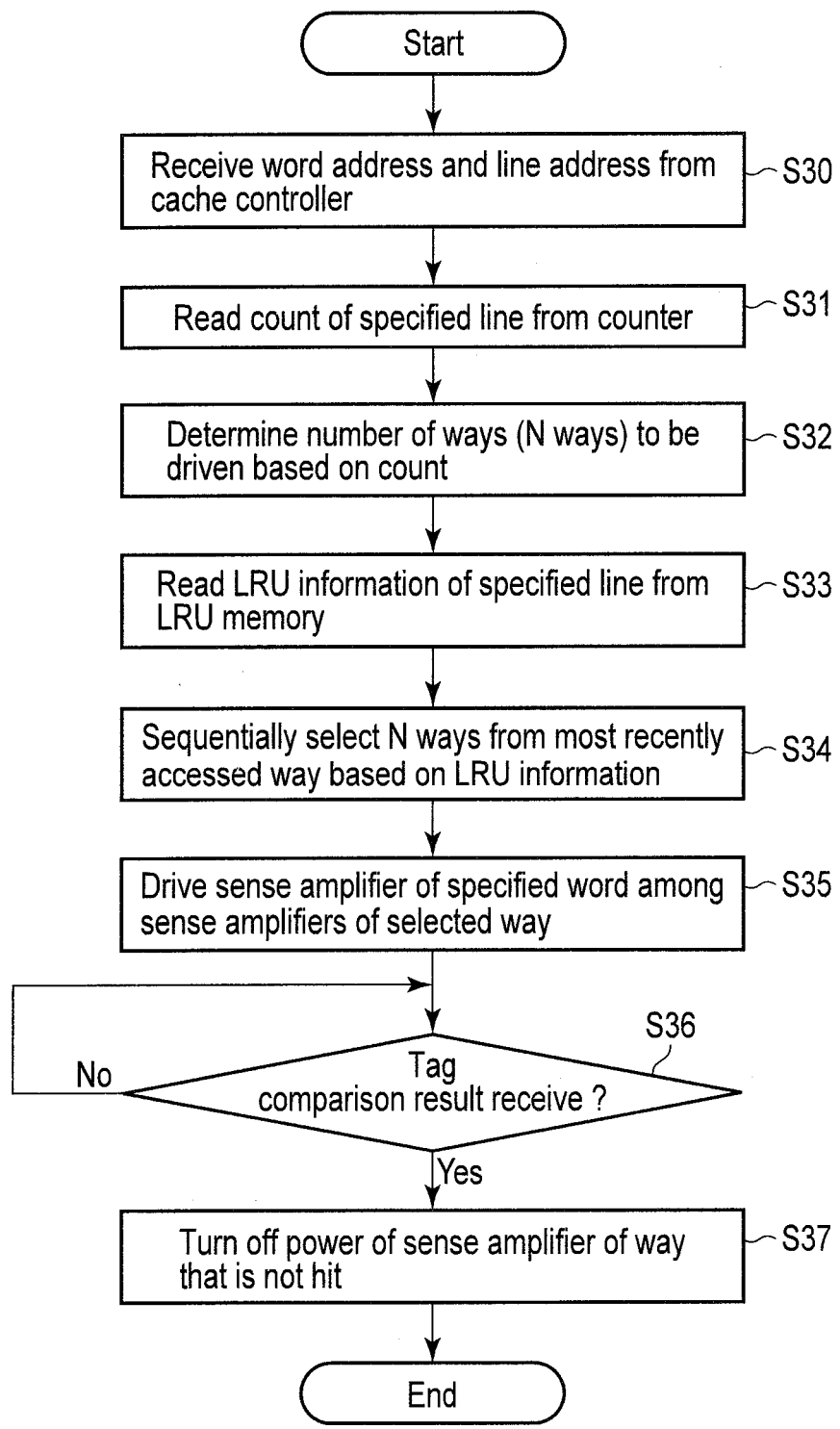
FIG. 13 is a flowchart for illustrating the operation of a sense amplifier controller.

FIG. 13 is a flowchart for illustrating the operation of the sense amplifier controller 13. In the initial condition, the sense amplifier controller 13 sends a low power-cut signal PC to all sense amplifiers SA of the data memory 11. As a result, the powers of all sense amplifiers SA are turned off.

First, the sense amplifier controller 13 receives a word address and line address from the cache controller 14 (step S30).

Then, the sense amplifier controller 13 reads the count of a line specified by the line address from the counter 16 (step S31). Next, the sense amplifier controller 13 determines the number of ways (N ways) to be driven among four ways W1 to W4 based on the count (step S32). That is, as described before, the count of the counter 16 is information indicating the length of time that has elapsed after the line is finally accessed and means that the line is more recently accessed as the count is smaller. For example, if the maximum value of the count for each line is set to 20, it is supposed that all of the ways are driven in the case of 0 to 5, three ways are driven in the case of 6 to 10, two ways are driven in the case of 11 to 15 and one way is driven in the case of 16 or more.

Then, the sense amplifier controller 13 reads LRU information of a line specified by the line address from the LRU memory 15 (step S33). Next, the sense amplifier controller 13 sequentially selects the N ways from the most recently accessed way based on the LRU information (step S34).

Subsequently, the sense amplifier controller 13 drives sense amplifier SA corresponding to a word specified by the word address among sense amplifiers SA of the N ways selected in step S34 (turns on the power thereof) (step S35). Specifically, the cache controller 14 sends a high power-cut signal PC to sense amplifier SA to be driven. As a result, cell current Idata and reference current Iref flow through sense amplifier SA that has received the high power-cut signal PC.

Then, when receiving the comparison result from the comparison circuit 12 (step S36), the sense amplifier controller 13 turns off the power of sense amplifier SA of a way that does not include a hit line (step S37). At this time, only sense amplifier SA that corresponds to a word specified by the word address in the line corresponding to the coinciding tag is driven and the powers of other sense amplifiers SA are turned off. If a line in which the power is already turned off is hit, a high power-cut signal PC is supplied again to sense amplifier SA to be driven from the cache controller 14 and reading is started.

After this, target data is read from the data memory 11 and the thus read data is supplied to the processor 2. At this time, a data latch circuit 37 outputs only data corresponding to the word address.

[3] Effect

As described above in detail, in the second embodiment, the counter 16 that holds a count indicating the a elapsed time starting when a line is finally accessed and the LRU memory 15 that stores LRU information indicating the order from the most recently accessed way are provided for each line. The number of ways (N ways) to be driven is determined based on the count of the line specified by an address and N ways are selected from four ways based on LRU information of the line.

Therefore, according to the second embodiment, the number of sense amplifiers SA to be initially driven after a read request is received from the processor 2 can be limited. As a result, the power consumption of the cache system 4 can be reduced.

Further, data included in one line of the data memory 11 includes a plurality of words and sense amplifier SA corresponding to a word specified by the address is driven. As a result, the power consumption of the cache system 4 can be further reduced.

In this embodiment, an SRAM is used as the tag memory 10, but the tag memory 10 can be constituted by an MRAM like the data memory 11.

In the first and second embodiments, it is desirable to more rapidly output the tag comparison result obtained by the comparison circuit 12 from the viewpoint of reducing the power consumption. For this reason, a content addressable memory (CAM) may be used as the tag memory 10 to further enhance the read speed of the tag memory 10. Likewise, a CAM may be used as the data memory 11.

Further, in the first and second embodiments, an MRAM is used as the nonvolatile memory, but this is not limitative and a nonvolatile memory of another type can be used.

In the first and second embodiments, the cache system 4 is used as a secondary cache memory, but may be applied to a cache memory of another hierarchy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cache system comprising:
   a tag memory comprising a volatile memory device, the tag memory comprising ways and storing a tag for each line;
   a data memory comprising a nonvolatile memory device including sense amplifiers for reading data, the data memory comprising ways and storing data for each line;
   a comparison circuit configured to compare a tag included in an address supplied from an external with a tag read from the tag memory; and
   a controller configured to turn off a power of a sense amplifier for a way which is not accessed based on a comparison result of the comparison circuit.

2. The cache system of claim 1, wherein
   the data includes words,
   the address includes a word address, and
   the controller further turns off the power of a sense amplifier other than a sense amplifier corresponding to a word specified by the word address.

3. The cache system of claim 1, wherein the data memory starts to read a line corresponding to the tag when receiving the tag included in the address.

4. The cache system of claim 1, wherein each of the sense amplifiers comprises a switch configured to turn off the power.

5. The cache system of claim 1, wherein
the data memory comprises a memory cell array having memory cells, word lines for selecting a row of the memory cell array, and bit lines for selecting a column of the memory cell array, and
the sense amplifiers are connected to the bit lines.

6. The cache system of claim 1, wherein the data memory comprises an MRAM.

7. The cache system of claim 1, wherein the tag memory comprises an SRAM.

8. A cache system comprising:
a tag memory comprising ways and storing a tag for each line;
a data memory comprising a nonvolatile memory device including sense amplifiers for reading data, the data memory comprising ways and storing data for each line;
a counter configured to hold a count indicating a elapsed time starting when a line is finally accessed for each line;
a comparison circuit configured to compare a tag included in an address supplied from an external with a tag read from the tag memory; and
a controller configured to determine the number of ways to be driven based on a count of a line specified by the tag included in the address, and to drive ways corresponding to the number of ways.

9. The cache system of claim 8, wherein the controller increases the number of ways to be driven as the count becomes smaller.

10. The cache system of claim 8, wherein the controller turns on a power of a sense amplifier for a way to be driven.

11. The cache system of claim 8, wherein the data memory starts to read a line corresponding to the tag included in the address after a way is driven by the controller.

12. The cache system of claim 8, further comprising an LRU (least recently used) memory storing LRU information indicating the order from the most recently accessed way for each line,
wherein the controller selects a way to be driven based on LRU information of a line specified by the address.

13. The cache system of claim 8, wherein
the data includes words,
the address includes a word address, and
the controller turns on a power of a sense amplifier corresponding to a word specified by the word address among sense amplifiers for a way to be driven.

14. The cache system of claim 8, wherein the controller turns off a power of a sense amplifier for a way which is not accessed based on a comparison result of the comparison circuit.

15. The cache system of claim 8, wherein each of the sense amplifiers comprises a switch configured to turn off the power.

16. The cache system of claim 8, wherein
the data memory comprises a memory cell array having memory cells, word lines for selecting a row of the memory cell array, and bit lines for selecting a column of the memory cell array, and
the sense amplifiers are connected to the bit lines.

17. The cache system of claim 8, wherein the data memory comprises an MRAM.

18. The cache system of claim 8, wherein the tag memory comprises an SRAM.

19. An information-processing device comprising:
a processor;
a cache system described in claim 1; and
a main memory.

* * * * *